Nov. 20, 1951

J. W. SCHMIED 2,575,397

TAPE STORAGE MECHANISM

Filed April 2, 1946

4 Sheets-Sheet 1

INVENTOR
J. W. SCHMIED
BY R. C. Terry
ATTORNEY

INVENTOR
J. W. SCHMIED
BY R. C. Lerry
ATTORNEY

INVENTOR
J. W. SCHMIED
BY R. C. Terry
ATTORNEY

Nov. 20, 1951 J. W. SCHMIED 2,575,397

TAPE STORAGE MECHANISM

Filed April 2, 1946 4 Sheets-Sheet 4

INVENTOR
J. W. SCHMIED
BY R. C. Terry
ATTORNEY

Patented Nov. 20, 1951 2,575,397

UNITED STATES PATENT OFFICE 2,575,397

TAPE STORAGE MECHANISM

James W. Schmied, Madison, N. J., assignor to Bell Telephone Laboratories, Incorporated, New York, N. Y., a corporation of New York Application April 2, 1946, Serial No. 658,931

16 Claims. (Cl. 271—2.1)

This invention relates to tape storage devices and in the exemplary embodiment described it relates to storage of tape between a telegraph perforator or reperforator and an associated transmitter.

This application is a continuation-in-part of copending application Serial No. 513,245 filed December 7, 1943, which has been abandoned.

In certain types of telegraph systems a tape perforating instrument, which may be operated either manually or under the control of signals from an incoming line or channel of transmission, is associated with an automatic telegraph transmitter which transmits messages under the control of the perforated tape. In some systems of this type apparatus incorporated with or associated with the transmitting instrument may direct different messages to different lines, channels or stations or, in some instances, a transmitting instrument will always transmit to one line, channel or station. However, under a variety of different circumstances in different systems the perforated continuous and unbroken loop of tape between the perforating instrument and the transmitting instrument may vary considerably in length and in some instances conditions of operation may require the accumulation of a relatively large amount of tape whereas at other times the transmitter may operate faster than the tape perforating instrument or at times when the tape perforating instrument is idle it may utilize all the tape which has been perforated. Of this class of arrangement there are two general types; the first type is one in which a residual length of tape equal in length to at least a few code combinations always extends between the perforating instrument and the transmitting instrument; in the other type the perforating instrument and the transmitting instrument are so related and associated that when the transmitting instrument overtakes the perforating instrument it senses and transmits the last character perforated in the tape; the present invention is equally applicable to either of these types of systems and is also applicable to those in which the transmitting instrument includes or is associated with line switching devices or not.

In systems of these types, in accordance with the prior art, the prior practice has been to allow tape from the perforating instrument to descend into a narrow tape receptacle or box and pile up as it accumulates in an irregular series of folds or loops whereas the transmitting instrument pulls the tape out of the tape receptacle or box as fast as and when it makes use of it for transmission. In order to prevent curling or tangling of the tape the box has been made only slightly greater in width than the tape. Thus, for example, if the tape is 11/16 inch in width the inside width of the box might be 12/16. The observation has been made, in connection with the use of such storage devices, that the incoming tape is always folded or looped in an irregular manner on top of the tape already stored, which necessitates that the transmitting instrument must pull the tape from the bottom of the accumulation. When considerable tape accumulates the weight of the top folds is considerable which necessitates that the transmiting instrument pull with considerable force at times in order to pull out the bottom fold or folds and use them for transmission. When the pulling tension becomes excessive the feed holes in the tape are likely to tear out and cause jamming of the transmitter or erroneous transmission. It has been found that the maximum amount of tape which can be stored and pulled out automatically by a transmitter without tearing the tape or demanding the services of an attendant for loosening the tape manually is in the neighborhood of about 50 to 75 feet. Under some circumstances it may be desirable to store and utilize a greater length of tape without necessitating attention on the part of an attendant.

One object of the present invention is to provide a method of storing tape and mechanism for automatically executing a method which will increase the amount which may be successfully stored and utilized; another object is to store the tape more effectively and conveniently with less danger of tearing or pulling out the feed holes than heretofore; to the extent that the invention resides in a method it may be performed by other apparatus than disclosed.

This object is achieved in the exemplary embodiment by storing successive folds of a loop of tape in such manner that the older or senior folds are placed on top of the newer or junior folds in consequence of which they may be pulled off the top with application of very little force, thereby reducing the need for attention to the apparatus or manual manipulation by an attendant.

A more general object is to automatically facilitate the storage of tape or to facilitate the storage of increased quantities of tape in connection with instrumentalities of the type in which a loop of tape or similar web of material is supplied continuously or at irregular intervals or at varying speeds at one end of the loop and automatically withdrawn continuously or at intervals or at varying speeds from the other end of the loop.

A further object is to provide such an organization of a form in which the residual loop may be short and unobstructed in that type of instrument which calls for a short and unobstructed residual loop and in which the residual loop may be zero in that type of instrument which requires a residual loop containing no untransmitted codes when the transmitter overtakes the perforator.

A further object is to provide, in instrumentalities of the class described, arrangements in which increased quantities of tape may be stored at intervals and increased quantities may be withdrawn from storage and utilized at other intervals and in which the stored portion may vary over the entire range of possible storage as the necessities of operation require.

A further and subsidiary object is to provide a storage mechanism which automatically places tape into a storage compartment from which successive folds may be withdrawn from the top and in connection with which means is provided for interrupting the storage when the compartment is filled to capacity; a subsidiary object is to permit tape to be stored, in an emergency, when the storage compartment is filled to capacity, in a secondary storage compartment.

The exemplary embodiment of the invention is diagrammatically illustrated in the accompanying drawings in which.

Figure 1:
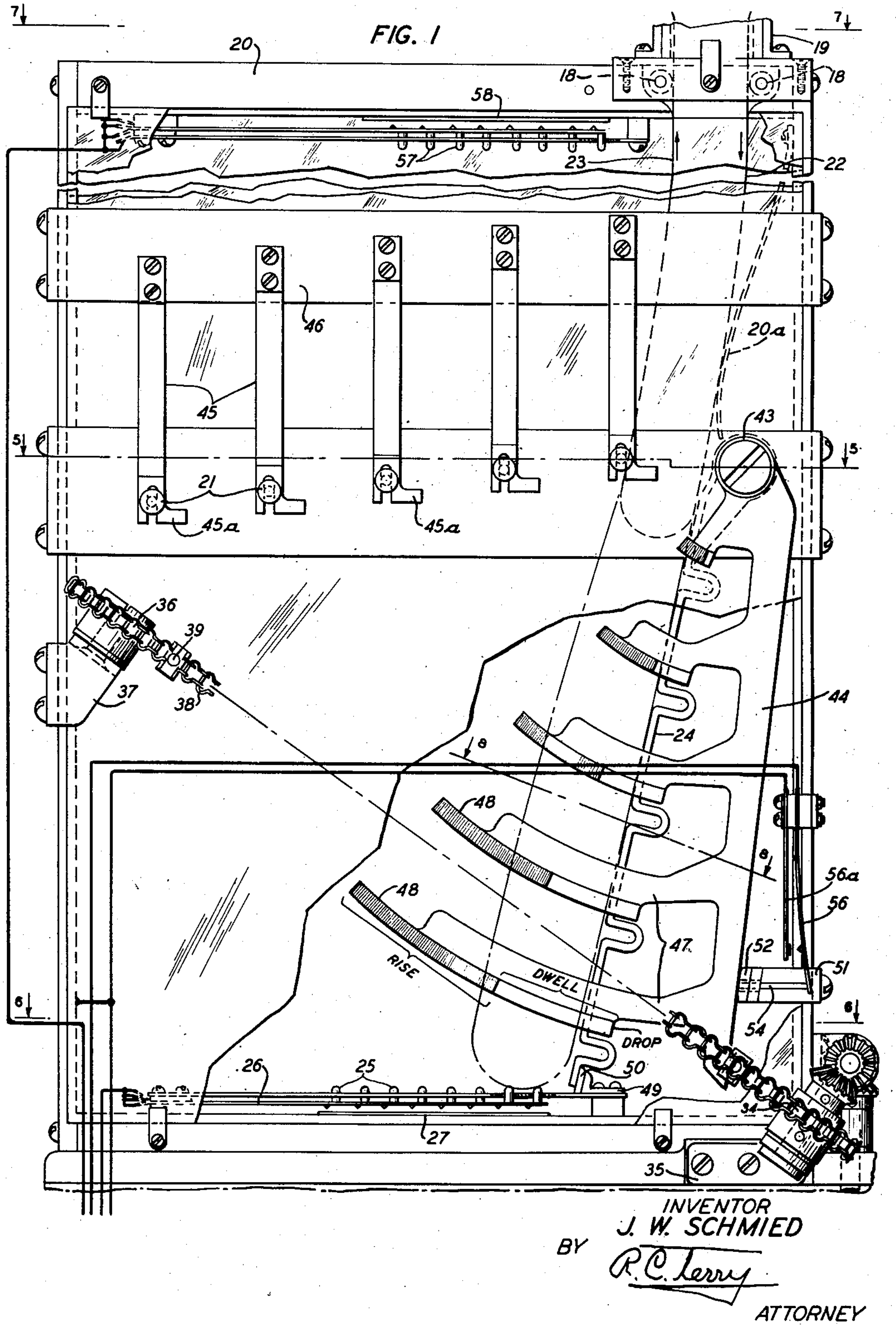
Fig. 1 is a side view of the mechanical instrumentalities incorporated in the exemplary embodiment with some parts being broken away to show more clearly the interior mechanism.
Figures 2, 3, 4, 8:
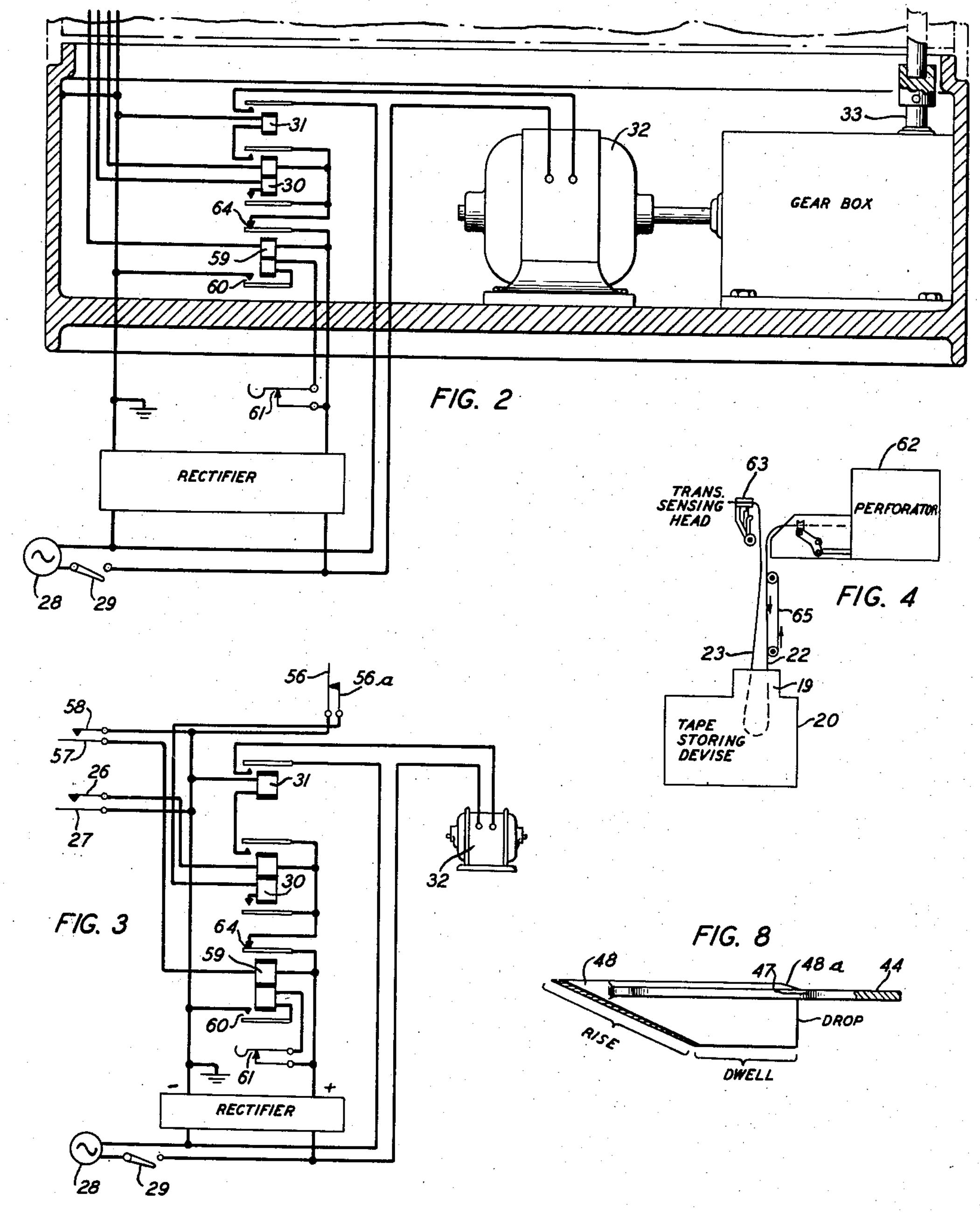
Fig. 2 is a circuit diagram of the electrical circuits for controlling the driving motor together with the motor itself, such motor and certain control relays being located in a compartment preferably arranged at the bottom of Fig. 1.
Fig. 3 is a schematic circuit diagram of the controlling contacts and relays which control the driving motor which operates the tape storing mechanism.
Fig. 4 illustrates diagrammatically the arrangement of parts in a perforator having associated therewith a sending transmitter which senses the last code combinations stored in the tape.

Fig. 8 is a cross-sectional view, looking downward, of a fragment of the apparatus along the line 8—8 of Fig. 1; and Figs. 9 to 14, inclusive, illustrate diagrammatically the process of storing successive folds or subloops of tape in a manner such that the older folds lie on top of the newer ones to permit successive withdrawal of the older or senior folds or subloops in the order of their formation.

Figure 7:
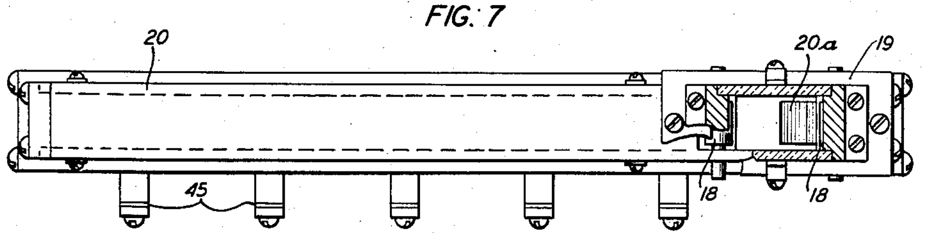
Fig. 7 is a view taken in a general direction along the line 7—7 of Fig. 1.
Figure 9:
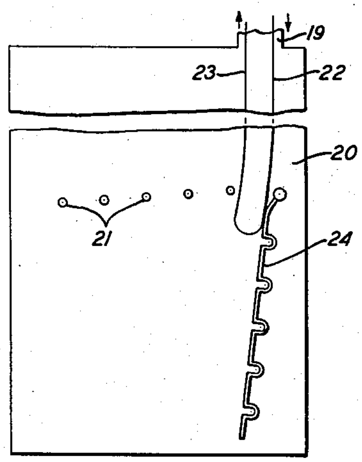

Before describing the details of the mechanism, reference is made to Figs. 9 to 14, inclusive, which illustrate diagrammatically the principles of operation. A storage box 20 is provided to hold the stored tape and this storage box comprises a bottom portion, wherein successive folds of tape may be formed, and an upper portion, in which successive folds of tape may be stored. The lower portion is separated from the upper portion by tape supporting pins 21. Five pins 21 are illustrated but as many pins may be provided as are needed. The tape arrives into the box 20 by successive increase in length of the right-hand leg 22 of the tape and is withdrawn by the transmitting machine which pulls the left-hand leg 23 of the tape out of the box. Guide rollers 18 (Figs. 1 and 7) permit the tape to descend into the tape box 20 from a tape chute 19, which may be long or short, and to be pulled therefrom with but little friction. A guide flange 20*a* shown in Figs. 1 and 7 guides the incoming tape away from the hub 38*a*, hereinafter mentioned, so that it forms a dependent loop or fold as shown in Figs. 1 and 9 without interference with the hub. The tape may be completely perforated, embossed, imprinted with dots for photoelectric transmission or it may be of the so-called chadless type which has trailing lids. In the latter case care should be taken that no attempt is made to fold the tape in such a manner that pulling of it will cause interlocking of the lids. The invention is equally applicable to all storage of tape wherein the fundamental requirements are the same.

Figure 10:
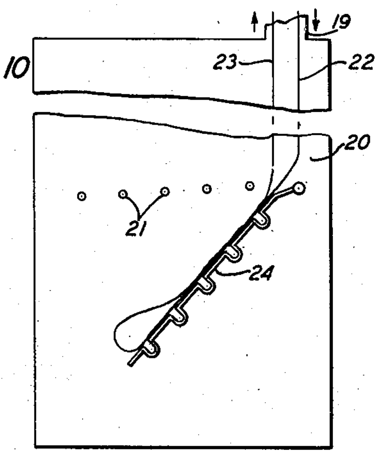
Figure 11:
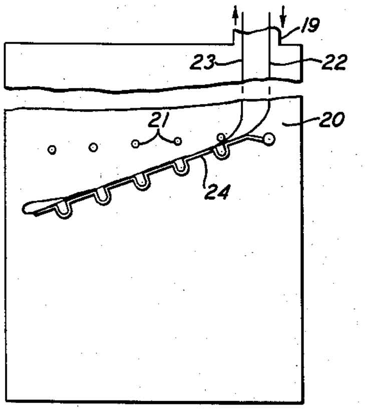
Figure 12:
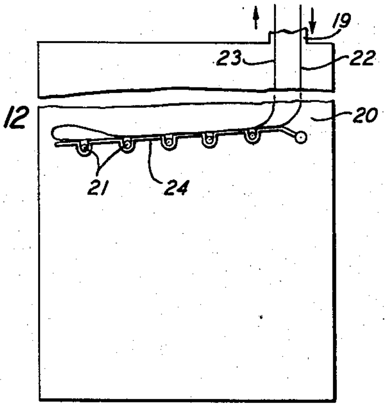
Figure 13:
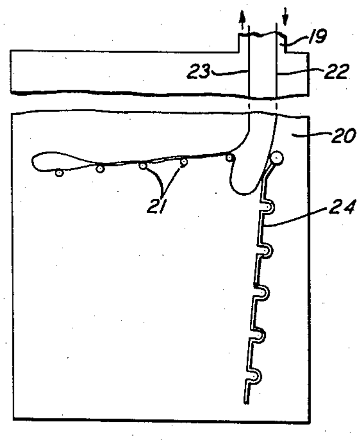
Figure 14:
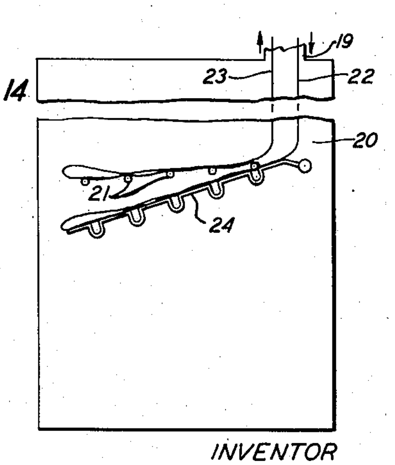

In a typical telegraph system a reasonably high speed perforator will produce approximately 45 inches of tape per minute and an equally high speed transmitter will utilize a similar amount of tape per minute while it is operating. Let us now assume that the perforating instrument, which may be either a perforator or a reperforator, is producing the tape which has commenced to descend into the box as shown in Fig. 9. When the fold or subloop of the tape has descended approximately to the bottom of the box an arm 24 swings upward and to the left as shown in Fig. 10 until it reaches a point approximately as shown in Fig. 11. At this time a mechanism hereinafter described retracts the pins 21 completely from the box with a rapid motion and the arm 24 continues its swing until the fold of the tape lies above the position originally occupied by the pins 21. The arm 24 is provided with transverse recesses of a width which just about fits the pins 21 and of a depth sufficient that the bottoms of the recesses are not carried above the pins. At a time when the fold of the tape is completely above the pins, as shown in Fig. 12, the pins are permitted to reenter the box with a rapid motion, thus forming a support for the tape when the arm 24 returns to its perpendicular position as shown in Fig. 13. When this happens the loop of tape thus formed is stored on top of the pins as shown in Fig. 13 and a new fold or subloop may form whereupon the operation is repeated and a second loop is stored under the old loop as is about to occur in Fig. 14. As shown in Fig. 14, after one or more loops have been stored, when the arm 24 is raised to that point of its swing in which the pins are retracted, the loop or loops already stored may fall down upon the newly formed loop, but when the arm 24 reaches the position shown in Fig. 12 all the loops will be pushed above the pins so that when the pins reenter the box all the loops will be supported upon the pins in such manner that the oldest subloop or fold is always on top. The space in the upper part of the box may be quite considerable so that a considerable number of folds or subloops of tape may be formed and stored. Thus, for example, if each fold or subloop comprises 3 feet of tape and thirty such folds are stored, the total stored length of tape may be 90 feet. These figures are illustrative only and are not intended to delimit the capabilities of an apparatus such as described, it may be more or less according to the size of the box and other considerations.

Reference may now be made to Figs. 1 to 8 with respect to apparatus for initiating and completing the upward swing and return of the storing arm 24 at appropriate intervals. As shown in Fig. 1, the tape loop 22, 23 will descend to the bottom of the fold forming part of the box 20 and come into contact with one or more lugs 25 which are distributed along the bottom of the box in such position that the tape will rest upon them. The lugs 25 are mounted either upon one or a series of light flexible springs 26 which are long and of delicate construction so that a very slight pressure on the lugs 25 will cause the closure of any one or several contacts 27, which are arranged in parallel to function as a single contact. Any type of spring-mounted contact may be employed. The closure of contact 27 energizes a path from a power source illustrated in Figs. 2 and 3 as a rectifier which supplies direct current under the control of a suitable alternating current source 28 through a switch 29 which is supposed to be closed during the use of the arrangement. The closure of a contact 27 operates a relay 30, which in turn operates a relay 31, which in turn closes the operating circuit of the motor 32.

The motor 32 immediately operates and continues to operate because the relay 30 is locked up over a path through its lower armature and contact under the control of a mechanical contact 56—56_a_ which is normally open but becomes closed very soon after the motor starts, and this maintains relay 31 operated and the motor 32 energized. The motor drives a shaft 33 through a suitable gear, conventionally illustrated, and the shaft 33 at its upper end has a bevel gear drive mechanism which initiates the rotation of a sprocket wheel 34 rotatably supported by a bracket 35. The sprocket wheel 34 rotates in counter-clockwise direction as viewed in Fig. 5. At the opposite side of the storage cabinet 20 and at the same distance from the front thereof as the sprocket 34 an idler sprocket 36 is rotatably supported by a bracket 37. Sprockets 34 and 36 have parallel axes and rotate in a plane which is oblique to the base of storage compartment 20, sprocket 34 being mounted near the bottom of the compartment and sprocket 36 being mounted somewhat below the extreme left-hand tape supporting pin 21. An endless chain 38 comprising links proportioned to fit the teeth of sprockets 34 and 36 is supported by the sprocket for movement in the direction indicated in Fig. 5.

Chain 38 has pins 39, preferably two in number, extending laterally in the plane of sprockets 34 and 36 and preferably equidistant from each other. The previously mentioned hub 38_a_, to which is secured the tape lifting arm 24 disposed inside tape storage casing 20 is secured to a pivot shaft 40, such as by a pin 41. Outside and in front of the tape storage compartment 20, the pivot shaft 40 has secured thereto as by a pin 42, the hub 43 of an arm 44. The free end of arm 44 is disposed in the path of pins 39 as they are carried around sprocket 34 and travel on the inner run of chain 38 towards sprocket 36.

Figure 5:
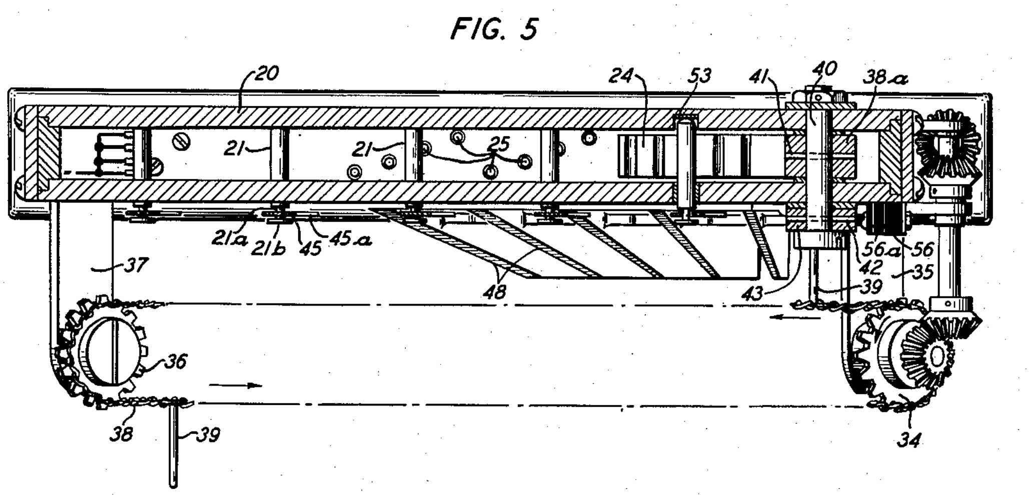
Fig. 5 is a view taken in a downward direction along the line 5—5 of Fig. 1.
Figure 6:
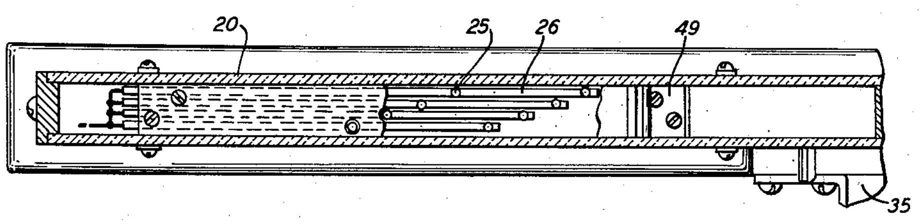
Fig. 6 is a view taken looking in a downward direction along the line 6—6 of Fig. 1.

It will be understood that the type of sprocket chain shown in Figs. 1 and 5 is illustrative of the principle and does not necessarily represent the specific construction of a chain which might actually be employed. It is contemplated that a sufficiently tight chain of such structure, size and ruggedness as to minimize sagging or twisting of a pin 39 under the load imposed upon it by arm 44 will be employed. For example, there are available well known bar-and-link sprocket chains, or roller-and-link sprocket chains, such as those commonly used on bicycles, which are characterized by little lateral flexibility and substantially no longitudinal torsion. Such a chain may be employed, or any one of numerous other types having little flexibility except in the plane of the sprocket upon which it operates might be employed.

As shown in Figs. 1 and 9 to 14, inclusive, tape supporting pins 21 are disposed in a plane which is slightly inclined from left to right. The portion of each pin which is disposed forwardly of tape storage compartment 20 includes a neck portion 21_a_ and a head 21_b_. Leaf springs 45, of which one is provided for each of the pins 21, are secured to a bracket 46 carried on the outside of tape storage compartment 20 and are bifurcated to fit over the necks of pins 21 between the heads and shoulders thereof. The bifurcations in springs 45 closely approximate the diameter of the necks of pins 21 but the length of the necks exceeds the thickness of the associated springs to accommodate axial retraction of the pins to the flexure of the springs. In the normal condition of springs 45 they are not under tension and if the pins 21 are disposed in their inner limit positions relative to tape storage box 20, the bifurcated portions of the springs 45 engage neither the heads nor the shoulders of pins 21 but occupy an intermediate position.

Each of the springs 45 is provided with a laterally projecting portion or finger 45_a_ presented toward the right. Arm 44 which is engageable by actuator pins 39 of chain 38 is provided with a plurality of projections 47 each of which carries or has integral therewith a cam member or portion 48. Cams 48 are arcuate in contour, are concentric with hub 42 of arm 44 and are at distances from the axis of the hub equal to the distances of lateral projections 45_a_ of springs 45 from the hub. In profile, each cam comprises a rise, a dwell and a drop. The dwell portions of the cams 48 are of the same height and are progressively longer in accordance with their distances from the axis of hub 43. The rise portions are also progressively longer in accordance with their distances from the axis of hub 43 and it follows from this that their slopes are progressively less steep. The leading edges of cams 48 are aligned radially of hub 43 and their trailing edges or drop portions are also radially aligned.

The motor 32 upon being set in operation as previously described imparts rotation to sprocket 34 in the direction indicated by the arrow in Fig. 5 and as one of the pins 39 comes into engagement with the right-hand edge of arm 44, the arm is rocked in clockwise direction as the pin moves along the inclined plane of chain 38. The tape lifting arm 24 is secured to hub 38_a_ and thereby comprises a rigid structure with arm 44, and swings in clockwise direction to sweep the subloop of tape toward pins 21. The lateral projections of springs 45 are so disposed relative to the plane of the leading edges of cams 48 that the cams enter between spring projections 45_a_ and the tape storage compartment. As arm 44 continues to rise, the rise portions of cams 48 bear against the inner faces of spring projections 45a and flex the springs outwardly, thereby retracting pins 21 from the tape storage casing 20. The rate of retraction of the pins may be fairly uniform because of the inverse proportionality of the length and slope of the rise portions of the several cams. Just before the tape fold becomes constrained between arm 24 and the pins 21, the pins are completely retracted from the tape storage compartment as the dwell portions of the cams are presented to the spring projections 45a. The residual movement of arm 24 as the dwell portions of the cams traverse the spring projections 45a forces the tape to a position so that all parts of it lie above the position to be occupied by the pins upon their subsequent return into the tape storage compartment. The tape will be sufficiently straight as it lies across the surface of the arm 24 so that upon the return of the pins they will be completely underneath the fold of the tape and thus supported in its raised position as shown in Fig. 13.

After the surface of arm 24 has moved the fold of tape above the plane of pins 21, now retracted, and before the innermost portions of the recesses in arm 24 have been brought up to the plane of the pins, the drop portions of cams 48 move clear of the spring projections 45a, permitting the springs to thrust the tape supporting pins 21 back into the tape storage compartment 20. Due to the lost motion represented by the length of the neck of the pins in proportion to the thickness of the springs, the springs may not thrust the pins to their inner limit positions but the pins will be thrust almost to this position and the stored tape fold will be adequately supported by the pins. After the spring projections 45a have escaped from the dwell portions of cam 48 and before the base portions of the recesses in arm 24 jam against pins 21, pin 39 of chain 38 which has been lifting arm 44 moves clear of the arm. The weight of arm 44 together with arm 24 is sufficient to cause these arms to fall back to their initial positions.

As shown in Fig. 8 each of the cams 48 is provided on its inner face and adjacent to the drop with a sloping portion 48a which engages the outer faces of the spring projections 45a and cams them in the opposite direction, namely, toward the tape storage compartment as the arm 44 swings downwardly. The cams 48 are thus permitted to pass over the tops of spring projections 45a and by virtue of the inward flexure of springs 45 they bear against the shoulders of pins 21 and drive to their innermost positions any pins which may not have been driven quite to their limit positions as the spring projections 45a escaped from the dwell portions of the cam. When the cams 48 in their downward movement move clear of spring projections 45a, the springs move outward and away from tape storage compartment 20 to their untensioned condition, the space between the shoulders and heads of pins 21 permitting this movement without any retraction or other disturbance of the pins. With the springs 45 restored to their untensioned condition, their projections 45a are disposed in front of the plane of the leading edges of cam 48, which are knife edges, so that the next time arm 44 is lifted by chain 38, the cams 48 will pass behind the spring projections 45a, between those projections and the tape storage compartment 20. If desired the box 20 may be provided with a rubber bumper 53 for each pin to reduce the noise and shock attendant upon the restoration of the pins into the tape storage compartments. Pins 21 and pivot shaft 40 and its associated hubs are mounted upon a metal framework constituting part of the box, whereas the lower portion of the box and the upper portion in which the tape is stored may be of glass or other transparent material to permit ready observation of the quantity of tape stored and its condition.

A backstop bracket 49, preferably having a cushion member 50 is provided for tape lifting arm 24. Also a backstop bracket 51, preferably having a cushion member 52 is provided for operating arm 44. A contact-operating pin 54 associated with contacts 56—56a is slidably mounted in bracket 51. When arm 44 was moved upwardly by chain 38, pin 54, which is aligned with operating arm 44, was shifted leftwardly by contacts 56—56a as they closed. Upon the gravitational restoration of arm 44 to its normal position after escaping from pin 39 of chain 38 the arm engages pin 54 as it nears its rest position and moves pin 54 rightwardly as it comes to rest against cushion member 52, thereby opening contacts 56—56a. By reference to Figs. 1, 2 and 3, it will be seen that the opening of contacts 56—56a opens the locking circuit of relay 30 and inasmuch as the contacts 27 are open, the tape loop having been lifted out of engagement therewith, the relay 30 will release, in turn releasing the relay 31 which stops the motor.

As the pin which lifted arm 44 moves clear of the arm and passes around sprocket 36, the second pin 39 which has been moving along the outer run of chain 38 approaches and passes around sprocket 34. It is preferable that the motor 32 shall decelerate and come to a stop before the second pin encounters and imparts any movement to arm 44. If the motor and gear system through which chain 38 is driven are sufficiently free running that the second pin would start to impart movement to arm 44, the second pin may be omitted. Under these circumstances when contact 27 again closes, and starts the motor, the arm 44 would not be moved until the single pin had traversed the outer run of chain 38 and had rounded sprocket 34. It is contemplated that the chain 38 shall accomplish the lifting of arm 44 to its uppermost position in an interval of about 1 to 3 seconds. Accordingly an interval of this order might elapse between the closure of contacts 27 and the beginning of movement of arm 44 by a single pin. If the perforator is producing tape at full speed, the fold or subloop of tape might be increased by one or two inches during this interval. Likewise the fold or subloop of tape might be further increased by one or two inches during the lifting of the loop. These increases may result in a small extension of the fold of tape beyond the free end of arm 24 and beyond the left-hand pin as shown in Figs. 12 to 14. This condition may be entirely desirable, as space may be left for the small fold of tape at the left-hand end to sag in a downward direction, which reduces crowding of the folds at the left-hand ends of the folds when the upper part of the storage box becomes relatively full. Moreover with the plane of the pins 21 sloping downwardly toward the left, additional depth to accommodate these folds is provided at the left-hand side of the tape storage box. The sloping of the plane of the pins 21 in this direction has the additional advantage that any shaking of folds of tape already in storage in the upper part of the box which may result from the delivery of additional folds of tape into storage by arm 24 will tend to cause the folds of tape to shift leftwardly away from the chute 19 through which tape enters and is withdrawn from the storage compartment, thus alleviating congestion of tape at the point of withdrawal.

It is contemplated that the transmitter may operate at any time during the storage of tape or while any quantity of tape between zero storage and full storage is raised into the upper part of the storage box and it will be observed that in so operating the transmitter will always pull from the top of the pile of stored folds of the tape.

Let us now assume that the upper part of the storage box becomes completely filled with the maximum quantity of tape which will occupy it without crowding the tape to such an extent that its withdrawal will become difficult. When this occurs the upper fold of the tape will come into contact with lugs 57 located at the top of the upper part of the storage box and close one or more contacts 58. By reference to Fig. 3 it will be seen that the closure of contacts 58 energizes the relay 59 which is provided with a locking circuit traced from the positive terminal of the rectifier through normally closed key 61, lower winding and lower make contact 60 of relay 59, to the negative terminal of the rectifier. When the relay 59 operates it interrupts at its break contact 64, comprising the upper armature and back contact, the conductive path from the positive terminal of the rectifier through key 61 to the right-hand terminal of the operating winding of the relay 30, and thereafter as long as the relay 59 remains operated the relay 30 will not be energized by closure of contact 27; the motor 32 will not be energized and no further automatic storage of tape in the upper part of the storage box will take place. Under this condition, if the reperforator continues to produce tape, the tape will descend into the lower portion of the storage box 20 and become stored therein to an extent and in a quantity substantially equal to the quantity which may be stored in a storage box in accordance with the existing practice. Thus, if the upper part of the storage box becomes full, the tape will continue to be stored in the lower part of the box until a considerable quantity has accumulated. It will be noted that under this condition, and after a single fold has accumulated in the lower part of the box, the automatic storing mechanism cannot and should not resume operation so long as more than one fold remains in the lower part of the box because, if several folds accumulated in the lower part of the box, and during the time while such accumulation persists the automatic storage mechanism should operate, the apparatus would be likely to jam or mutilate the tape. However, assuming that under this condition the switch 29 is closed and the apparatus continues to operate, there can be accumulated a considerable quantity of tape in the lower part of the box as stated above and the transmitter may continue to operate and withdraw tape from the quantity accumulated in storage until the upper part of the box is empty; at this time, if the transmitter is utilizing the tape faster in the aggregate than the perforating mechanism is producing tape, the quantity in the lower part of the box will be withdrawn and used. At any time after the quantity in the lower part of the box has thus been reduced to a single fold or less, an attendant may momentarily open key 61 conveniently located upon any part of the mechanism, with the result that the relay 59 is deenergized because under the condition that the upper portion of box 20 is empty the contact 57—58 will be open and the automatic storage mechanism will resume its normal course of operation. Thus, for example, if during the course of a day's business the upper part of the storage box becomes completely filled, subsequently accumulated tape may be allowed to accumulate in the lower part of the storage box. Then at the end of the day or during a slack period the entire accumulation may be used and a single operation of the key returns the mechanism to the condition whereby both storage spaces are available. Thus, in addition to storing a considerable quantity of the tape in the upper part of the storage box, the capacity of the lower part of the storage box, which is in itself equivalent to the storage capacity according to prior practices, may be utilized in emergencies.

In one known type of apparatus which is exemplified by Wack Patent 2,331,947, dated October 19, 1943, a perforator or reperforator is combined with a sensing head and transmitting instrument which is pivoted to move to and from the perforator in such a manner that when the tape is used up the sensing head advances up to the perforator to sense and transmit the last perforated code combination but when tape begins to accumulate the sensing head moves away from the perforator on its pivot to allow the tape to descend to a storage box. Such an arrangement is illustrated in Fig. 4 in which a perforator diagrammatically indicated at 62 supplies a tape loop 22, 23 and a sensing head diagrammatically indicated at 63 senses the tape and transmits under the control of perforations punched therein. Furthermore, in this type of arrangement the perforators and reperforators are located in a two-story housing so that one instrument is generally located above another and the tape from the upper one descends from a considerable height to reach its storage box. In this type of mechanism a friction driving belt 65 is employed to carry the tape from the higher of the two reperforators down into the box in a satisfactory manner. In such arrangements boxes with glass walls are set side by side, one to store tape from the upper perforator and the other to store tape from the lower perforator. The present invention may be incorporated in such arrangements in association with both boxes inasmuch as it will be seen that all the mechanism for one box is located on one side thereof and a similar mechanism could be provided for and located upon the opposite side of a twin box located immediately alongside the single box illustrated in the drawings. In such case, of course, the operating mechanism for the other box would be so made that the parts thereof corresponded to the parts shown in the drawings but located and operating symmetrically with respect to a plane drawn through the adjacent walls of the two boxes; in other words, one box would have its storing mechanism in front of the box and the other mechanism would be in the rear of its box, both mechanisms could be operated by the same motor. If the space between the boxes were made adequate, which is not the case in a specific type of systems now in use, the two mechanisms could be substantially alike and similarly located with respect to their respective boxes.

An illustrative example of a system with which the present invention may be used is disclosed in Patent 2,430,447, granted November 11, 1947, to D. E. Branson et al., and an example of perforating-transmitting equipment is disclosed in Gubisch Patent 2,348,214, granted May 9, 1944.

What is claimed is:

1. In combination, a receptacle having a single opening through which tape in the form of a loop is supplied and from which it may be intermittently and entirely withdrawn, and a feeding mechanism for feeding tape into said receptacle, in combination with mechanism for conforming tape supplied to said receptacle to folds and for storing them in said receptacle in an orderly and systematic arrangement, one fold at a time upon each operation of said fold conforming and storing mechanism, driving means for causing said fold conforming and storing mechanism to operate to store a fold, and control means for causing operation of said driving means after the feeding into said receptacle of a quantity of tape equivalent to one fold under control of said feeding mechanism.

2. In combination, a receptacle having a single opening through which tape is supplied and through which it is withdrawn, the supply and withdrawal occurring at irregular intervals whereby the quantity of tape in said receptacle varies over wide limits, a tape supply device for feeding tape into said receptacle, in combination with means for conforming tape supplied to said receptacle to folds and means for holding in said receptacle the folds of the tape so arranged in relation to said single opening that the senior fold may be withdrawn without disturbing others, and power driven means operable under initiatory control of said tape for actuating said tape conforming means and said holding means periodically incident to the supplying of tape by said device.

3. In combination with a tape receptacle for storing a continuous loop of tape, means for feeding tape into said receptacle, means for withdrawing said tape from said receptacle, movable means for conforming tape supplied by said feeding means to folds and for transporting into storage successive folds of said tape one at a time as formed in an orderly manner, in combination with a control element actuated by the tape upon the supplying by said feeding means of a sufficient amount thereof to form a fold to cause said means to execute a fold conforming and transporting operation.

4. A tape storage box having an upper and a lower part separated by partitioning means which extend across the box, means for feeding tape into said box, means for withdrawing said tape from said box, means for causing a fold of tape to form in the lower part of said box, means operable at intervals for withdrawing said partitioning means, means operable simultaneously during the time of withdrawal of said partitioning means for stowing said fold above said partitioning means, and means for returning said partitioning means under the fold so formed to retain the fold in the upper part of the box.

5. A tape storage box having a fold-forming space and a fold-storing space, means for feeding tape into said fold-forming space, a contact in the fold-forming space, and means controlled by said contact for delivering a fold of tape when formed in said fold-forming space to said fold-storing space, in combination with control means operable incident to the storage of sufficient tape in said fold-storage space to render said contact ineffective whereby the accumulation of a substantial quantity of the tape in the primary fold-forming space may occur without interference by said contact.

6. A tape storage instrumentality comprising a contact actuated incident to the supply of a quantity of the tape, a tape storage compartment, means for conveying said quantity of tape to said compartment, driving means for said conveying means operated by operation of said contact, locking means for continuing the operation of said driving means independently of said contact after initiating of operation, and unlocking means for stopping the operation of said driving means after completion of a tape conveying operation.

7. In a tape storing device, a tape storage box, means for feeding tape into said box, means for transferring substantially equal increments of tape fed into said box to a predetermined part thereof for storage, means responsive to accumulation of tape equal to one of said increments for operating said tape transferring means, means responsive to capacity storage of tape in said predetermined part of said box for disqualifying said tape transferring means, and means responsive only to manual operation for requalifying said tape transferring means.

8. In a tape storing device, a tape storage box comprising primary and secondary compartments, means for feeding tape into said primary compartment, means for transferring substantially equal increments of tape fed into said primary compartment to said secondary compartment, means responsive to accumulation in said primary compartment of tape equal to one of said increments for operating said tape transferring means, means responsive to capacity storage of tape in said secondary compartment for disqualifying said tape transferring means whereby to cause additionally fed tape to accumulate in said primary compartment, and means responsive only to manual operation for requalifying said tape transferring means.

9. A tape storage instrumentality including a contact actuated incident to the supply of a quantity of tape, a tape storage compartment, means for conveying said quantity of tape to said compartment, driving means for said conveying means operated by operation of said contact, locking means for continuing the operation of said driving means independently of said contact after initiation of operation, and unlocking means operable by said conveying means upon completion of a conveying operation for stopping the operation of said driving means.

10. In a tape storing device, a tape storage box, means for feeding tape into said box, a swingable arm for transferring substantially equal increments of tape fed into said box to a predetermined part thereof for storage, means comprising retractable pins normally disposed transversely of said box for supporting stored tape in said predetermined part of the box, means associated with said arm for retracting said pins incident to the tape transferring movement of said arm, means for restoring said pins independently of said retracting means, and power driven means adapted to engage and swing said arm and to permit said arm to escape from said power driven means for gravitational restoration.

11. In a tape storing device, a tape storage box, means for feeding tape into said box, a swingable arm for transferring substantially equal increments of tape fed into said box to a predetermined part thereof for storage, means comprising retractable pins normally disposed transversely of said box for supporting stored tape in said predetermined part of the box, means associated with said arm for retracting said pins incident to the tape transferring movement of said arm, means for restoring said pin independently of said retracting means, a power-driven endless flexible member, and means associated with said member for engaging and imparting tape transferring movement to said arm and adapted to permit escape of the arm for gravitational restoration.

12. In combination with tape supplying and tape utilization instrumentalities, a receptacle having an entrance and an exit for a tape web, a plurality of retractable pins disposed in a plane and forming a barrier between lower and upper portions of said receptacle, a pivoted arm adapted to sweep an accumulated loop of said tape web upwardly toward said barrier pins, cam means operable with said arm for retracting said pins to accommodate passage of said loop above the plane of said pins, and means for restoring said pins to retain said loop above said plane.

13. In combination with tape supplying and tape utilization instrumentalities, a receptacle having an entrance and an exit for a tape web, a plurality of retractable pins disposed in a plane and forming a barrier between lower and upper portions of said receptacle, a pivoted arm adapted to sweep an accumulated loop of said tape web upwardly toward said barrier pins, cam means operable with said arm for retracting said pins to accommodate passage of said loop above the plane of said pins, and means for restoring said pins to retain said loop above said plane, said arm having indentations to permit restoration of said pins while the tape engaging surface of said arm supports said loop above the plane of said pins.

14. In combination with tape supplying and tape utilization instrumentalities, a receptacle having an entrance and an exit for a tape web, a plurality of retractable pins disposed in a plane and forming a barrier betwen lower and upper portions of said receptacle, a pivoted arm adapted to sweep an accumulated loop of said tape web upwardly toward and past the normal position of said barrier pins, cam means operable with said arm for retracting said pins to accommodate passage of said loop above the plane of said pins, spring means for restoring said pins at least sufficiently to retain said loop above said plane, and cam means for positively completing the restoration of said pins.

15. In combination with tape supplying and tape utilization instrumentalities, a receptacle having an entrance and an exit for a tape web, a plurality of retractable pins disposed in a plane and forming a barrier between lower and upper portions of said receptacle, a power driven and gravity return arm adapted to sweep an accumulated loop of said tape web upwardly toward said barrier pins, means associated with said arm for retracting said pins to accommodate the passage of said loop above the plane of said pins, means for restoring said pins to retain said loop above said plane, and driving means disengageable from said arm substantially coincidentally with the restoration of said pins.

16. In combination, a receptacle having a single opening through which tape is supplied and through which it is withdrawn, the supply and withdrawal occurring at irregular intervals whereby the quantity of tape in said receptacle varies over wide limits, a tape supply device for feeding tape into said receptacle, in combination with means for conforming tape supplied to said receptacle to folds and means for holding in said receptacle the folds of the tape so arranged in relation to said single opening that the senior fold may be withdrawn without disturbing others and the tape may be entirely withdrawn from said receptacle, and means for actuating said tape conforming means and said holding means periodically incident to the supplying of tape to said receptacle.

JAMES W. SCHMIED.

REFERENCES CITED

The following references are of record in the file of this patent:

UNITED STATES PATENTS

| Number | Name | Date |
|---|---|---|
| 518,230 | Egry | Apr. 17, 1894 |
| 563,849 | Egry | July 14, 1896 |
| 661,295 | Rigamonti et al. | Nov. 6, 1900 |
| 1,950,098 | Casperson | Mar. 6, 1934 |
| 2,020,419 | Knowlton | Nov. 12, 1935 |
| 2,224,606 | Neckel | Dec. 10, 1940 |
| 2,248,122 | Rosenthal | July 8, 1941 |
| 2,259,517 | Drenkard | Oct. 21, 1941 |
| 2,331,947 | Wack | Oct. 19, 1943 |
| 2,353,608 | Zenner | July 11, 1944 |
| 2,397,762 | Steele | Apr. 2, 1946 |